United States Patent

[11] 3,625,602

| [72] | Inventors | Robert P. Grandall;<br>Ronald A. Phillips, both of Rochester, N.Y. |
|---|---|---|
| [21] | Appl. No. | 730,484 |
| [22] | Filed | May 20, 1968 |
| [45] | Patented | Dec. 7, 1971 |
| [73] | Assignee | Eastman Kodak Company<br>Rochester, N.Y. |

[54] STRIP FEED GUIDE
10 Claims, 4 Drawing Figs.

[52] U.S. Cl. .................................................. 353/26,
352/224, 353/95
[51] Int. Cl. ....................................................... G03b 23/12
[50] Field of Search .......................................... 353/95, 26,
120; 355/76; 352/224

[56] References Cited
UNITED STATES PATENTS

| 1,966,684 | 7/1934 | Pollock | 352/224 X |
| 3,271,099 | 9/1966 | Debrie | 352/224 X |

FOREIGN PATENTS

| 1,427,800 | 1/1966 | France | 352/224 |
| 653,662 | 5/1951 | Great Britain | 352/224 |

*Primary Examiner*—William D. Martin, Jr.
*Attorneys*—Robert W. Hampton and R. Lewis Gable ABSTRACT: Apparatus is disclosed for receiving a strip of photographic film and for precisely disposing the film with respect to an associated lens and radiation source, which project the images from the strip of film onto a display surface. This apparatus includes a lower guide plate having a V-shaped groove therein and a spring-biased gate having a second V-shaped groove therein between which grooves is driven the strip of film. The spring-biased gate is pivotably mounted about an axis which may be adjusted to coincide with the desired placement of the strip to ensure accurate focusing of the images contained upon the strip of film. More specifically, the gate is disposed upon a hanger by a pair of clips, whose position may be adjusted with respect to the lower guide plate.

ROBERT P. CRANDALL
RONALD A. PHILLIPS
INVENTORS

BY R. Lewis Gable

Robert W. Hampton
ATTORNEYS

3,625,602

STRIP FEED GUIDE

CROSS-REFERENCES TO RELATED APPLICATIONS

Reference is made to commonly assigned U.S. Pat. application Ser. No. 730,252, entitled "Strip Handling System," filed May 20, 1968 in the names of Robert P. Crandall and Ronald A. Phillips, now U.S. Pat. No. 3,493,193.

BACKGROUND OF THE INVENTION

1. Field of the Invention

This invention relates to guides for receiving elongated strips of a flexible material and more particularly to those guides for receiving and accurately placing a strip of photographic film with regard to an associated projection system.

2. Description of the Prior Art

There are many problems associated with the projection and display of images from a strip of photographic film. First, the surface of the film must be accurately placed with regard to the associated lens system and display screen so that the image carried by the film may be precisely focused upon the display screen. Second, the strip of photographic film must be drawn past the associated lens system with relatively little interference so that a series of images may be consecutively displayed. Both of these problems are complicated by the tendency of elongated strips of photographic film to become convex in the direction of its width due to the presence of a lateral thrust developed by the film strip guide. In addition, the thickness and width of a strip of photographic film does have a tendency to vary thereby aggravating the problems associated with the focusing and driving of the filmstrip through the guide.

It has been suggested by the prior art such as in U.S. Pat. Nos. 2,142,606 and 2,229,924 that a strip of film be held in an arcuate path to ensure the flatness of the strip along its width dimension. The desired arcuate path may be formed by two V-shaped grooves disposed in opposing guide plates. One of the guide plates is held stationary whereas the other guide plate is spring biased toward the first guide plate. In this manner, a strip of film is held flat along its width dimension, and various widths and thicknesses may be accepted by such strip guides.

Film guides are typically used in situations where it is desired to project an image on or from a strip of film being driven through the guide. In the manufacture and assembly of such devices, it would be very desirable to be able to adjust the strip guides with respect to remaining portions of the display system. It is understood that there may be slight variations in the dimensions of the strip guide, and to ensure accurate focusing of the image projected from or onto the strip, it will be necessary to adjust the surface of the film with regard to the associated lens and display surface.

SUMMARY OF THE INVENTION

It is therefore an object of the present invention to provide a new and improved strip guide which may be adjusted with respect to its associated lens to ensure the proper focusing of the image from or upon the strip.

It is a more particular object of this invention to provide a new and improved strip guide having at least one spring-biased plate whose position is capable of being accurately adjusted.

In accordance with the teachings of this invention, the above recited and additional objects may be accomplished by a strip guide including a first, relatively stationary guide plate and a second guide plate resiliently biased toward the first guide plate and capable of being adjusted with respect to the associated lens system. More specifically, the first and second guide plates have corresponding grooves therein for receiving a strip of material such as photographic film. In accordance with the teaching of this invention, the second guide plate or gate is pivotally mounted about an axis which is adjusted to substantially coincide with the edge of the strip directed through the gate. By so pivotally mounting the gate, a strip of film varying width and thickness will not be substantially displaced from that surface for which the gate has been adjusted to ensure proper focus. Additional means are provided for adjusting the axis about which the spring-biased gate pivots to thereby vary the position of the strip with respect to the associated lens system thus assuring the precise focusing of images from the strip.

An additional aspect of this invention involves the use of suitable chambers for receiving and directing a cooling medium onto both sides of the strip.

BRIEF DESCRIPTION OF THE DRAWINGS

These and other objects and features of the present invention will become more apparent when considered in view of the following description of the drawings in which.

DESCRIPTION OF THE PREFERRED EMBODIMENT

Figure 1:
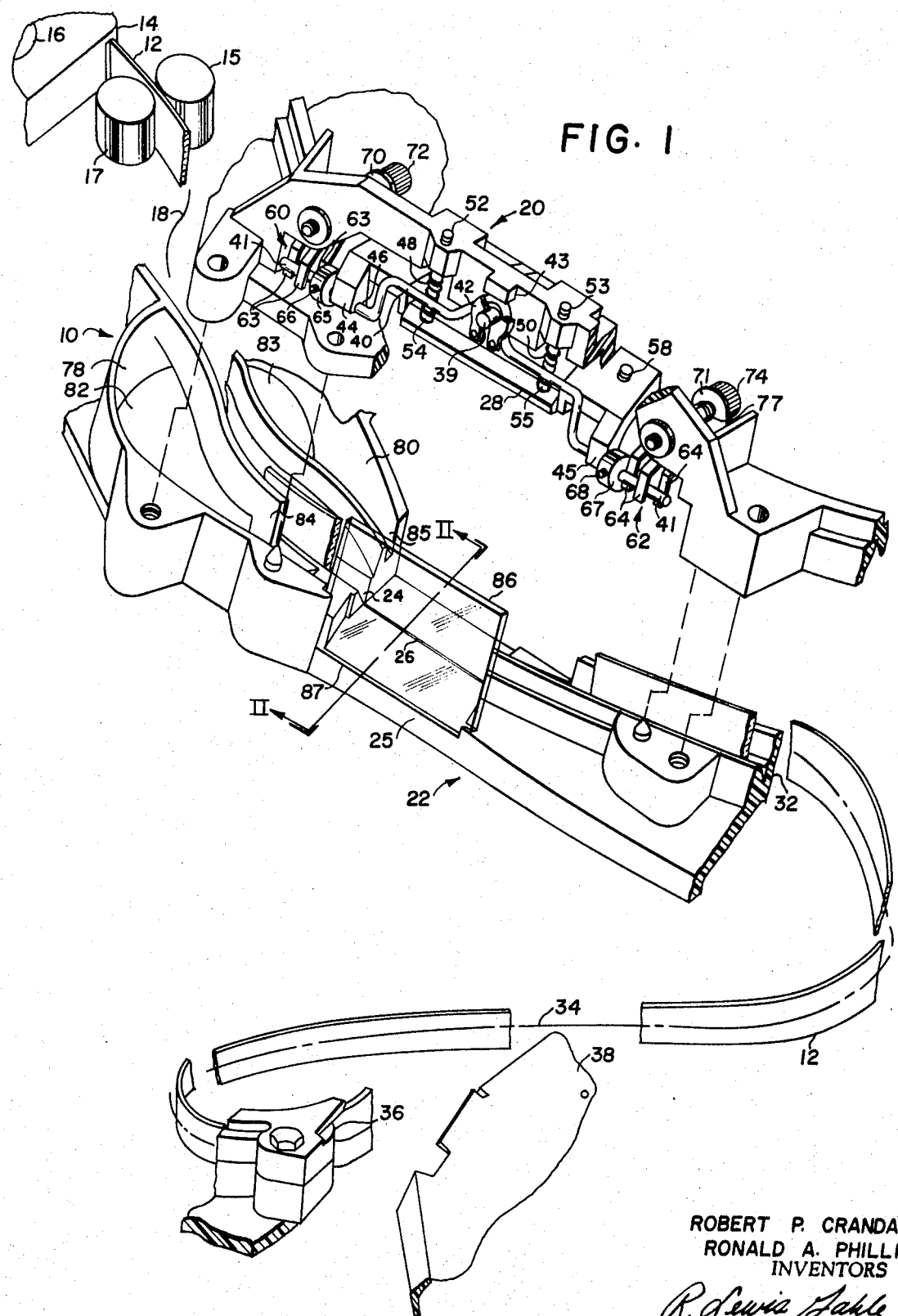
FIG. 1 is an exploded front perspective view of the strip feed guide in accordance with the teachings of this invention.

With reference to the drawings and in particular to FIG. 1, there is shown a strip feed guide 10 for receiving and accurately placing a strip 12 of flexible material such as photographic film with regard to an associated lens system and source of radiation (not shown). Illustratively, the strip feed guide 10 may be used in conjunction with a microfilm reader in which there is inserted a magazine 14 having a core 16 about which is wound the strip 12. As is explained in the above-identified copending application by the inventors of this invention and assigned to the assignee of this invention, entitled "Strip Handling System" now U.S. Pat. No. 3,493,193, a capstan roller 17 is connected to a suitable drive motor (not shown) to impart an unwinding motion to the strip 12. A pressure roller 15 may be resiliently biased against the other side of the strip 12 to hold the strip in engagement with the capstan roller 17. As shown in FIG. 1, the strip 12 is fed along a guided path 18 as provided by the strip feed guide 10 and into an entrance ramp 24. The strip 12 is driven through the strip feed guide 10 by the capstan roller 17 to be discharged by an exit ramp 32 along an exit path 34. The strip 12 is directed from the strip feed guide 10 through an opening 36 into a festoon chamber 38. The festoon chamber 38 stores the strip 12 in an irregular, serpentine configuration. The sides of the festoon chamber 38 may be in the shape of a shallow V to prevent the image portion of the strip 12 from being scratched. When desired to rewind the strip 12 into the magazine 14, a suitable rewinding torque is applied to the core 16 to withdraw the strip 12 from the festoon chamber 38 through the strip feed guide 10.

Figure 2:
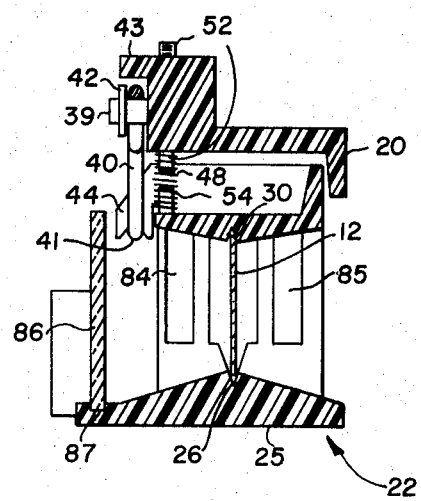
FIG. 2 is a sectional view of the strip feed guide taken along line II—II of FIG. 1.

The strip feed guide 10 may include a top assembly 20 and a bottom assembly 22 which are mated to fit together and may be secured by suitable means such as a plurality of nuts and bolts (not shown in FIG. 1) to be inserted through openings within the top and bottom assemblies 20 and 22. As shown in FIGS. 1 and 2, the bottom assembly 22 includes a bottom guide plate 25 having a substantially V-shaped groove 26 of a slightly arcuate configuration disposed therein. The top assembly 20 includes an adjustable gate 28 flexibly biased by a pair of springs 48 and 50 towards the bottom guide plate 25. The gate 28 has a V-shaped groove 30 therein of an arcuate configuration similar to that of groove 26. The arcuate configuration of grooves 26 and 30 help maintain the flatness of the strip 12 along its width dimension. The groove 26 is slightly elevated from the floor of the bottom assembly 22, and the strip 12 is gradually guided into the groove 26 by the ramp 24. Similarly, the top assembly 20 has a similar ramp (not shown) for guiding the strip 12 into the groove 30 of the adjustable gate 28. A similar transition is made by the exit ramp 32 of the bottom guide plate 25 and an exit ramp (not shown) of the top assembly 20. It is noted that it is desirable to allow the strip 12 a certain amount of freedom in its travel along those portions of the strip feed guide 10 before and after the adjustable gate 28 in order to allow the strip 12 to be easily driven through the guide 10.

In accordance with the teachings of this invention, the adjustable gate 28 is mounted upon a U-shaped hanger 40. As more clearly seen in FIG. 1, the gate 28 has a pair of fingers 44 and 45 each with a groove for receiving the U-shaped hanger 40. A groove 46 in the finger 44 is visible in FIGS. 1 and 2. The U-shaped pivoting hanger 40 has a pair of extending arms 41 upon which the grooves of the fingers 44 and 45 are disposed. The extending arms 41 form the axis about which the adjustable gate 28 is mounted and as will be explained in detail later, arms 41 are adjustable in a direction substantially normal to a plane defined by grooves 26 and 30. The center portion of the hanger 40 is loosely suspended from the top assembly 20 between a rod-shaped member 39 extending from the assembly 20 and a knob 43. A spring lock washer 42 is disposed about the member 39 to secure the hanger 40 between the member 39 and the knob 43.

Figure 3:
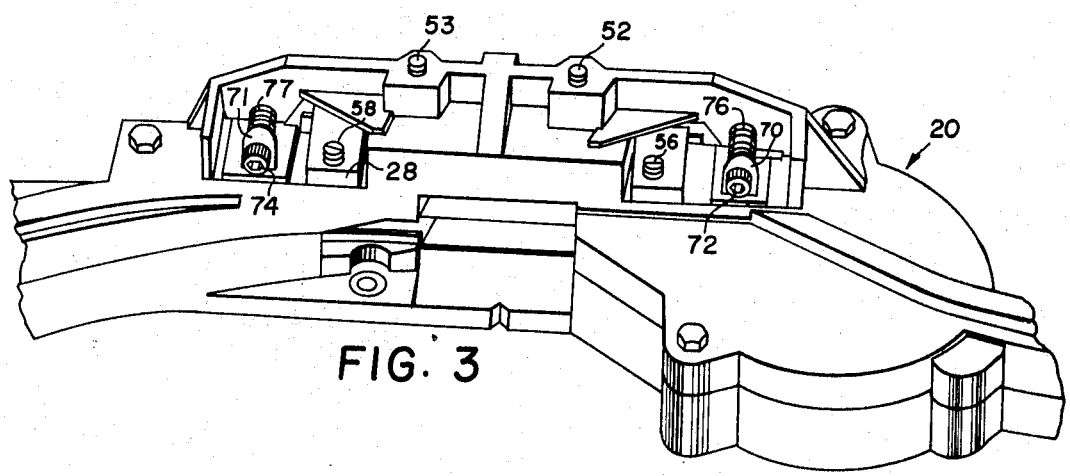
FIG. 3 is a rear perspective view of the strip feed guide of FIG. 1.

As shown in FIGS. 1 and 2, a pair of biasing springs 48 and 50 are respectively disposed upon a pair of screws 52 and 53 threadably received by the top assembly 20. The other ends of the springs 48 and 50 are respectively received by rods 54 and 55 affixed to the adjustable gate 28. A pair of stops 56 and 58 (see FIG. 3) are threadably received by the gate 28 and are adjustably disposed against the upper assembly 20 to prevent the gate 28 from closing too far when the strip 12 has been removed.

As shown more clearly in FIG. 1, a pair of adjustable clips 60 and 62 are provided for adjustably mounting the hanger 40 with respect with the associated lens and source of radiation. More specifically, the adjustable clips 60 and 62 respectively have finger 63 and 64 for grasping the extending arms 41 of the hanger 40. A pair of spacers 65 and 67 are respectively secured by setscrews 66 and 68 to the extending arms 41 of the hanger 40. The spacers 65 and 67 abut respectively against the fingers 44 and 45 to limit the axial movement of the gate 28 along the extending arms 41 due to the strip 12 being driven past the gate 28. The clips 60 and 62 are respectively connected to the top assembly 20 by a pair of adjustable bolts 72 and 74. The bolts 72 and 74 are threadably received within openings of the top assembly 20. Further, each of the clips 60 and 62 respectively has upright flange portions 70 and 71 through which are disposed the adjustable bolts 72 and 74. A pair of springs 76 and 77 are respectively disposed about the adjustable bolts 72 and 74 to bias and position the flange portions 70 and 71 against the heads of the bolts 72 and 74. By rotating the bolts 72 and 74, the position of the clips 60 and 62 may be adjusted to thereby determine the position of the hanger 40 and the groove 30 (as shown in FIG. 2) of gate 28 with respect to the groove 26 in the bottom assembly 22.

Figure 4:
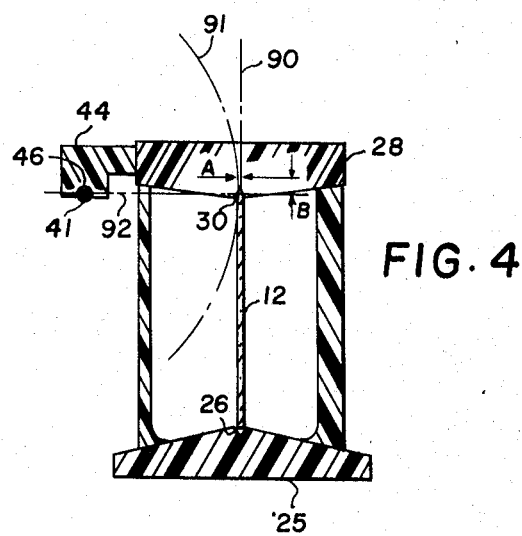
FIG. 4 is a sectioned, diagrammatic view of the strip feed guide of FIG. 1.

In accordance with the teachings of this invention, the adjustable gate 28 is mounted upon the hanger 40 in such a manner that the gate 28 may be flexibly biased along a path that will substantially maintain the strip 12 in a predetermined focusing plane. The width and thickness of the strip 12 may vary within a single strip or between different strips of film. Therefore, the gate 28 will be pressed upwards against the pair of springs 48 and 50 as these dimensions are increased. However, it is desired to keep the strip 12 substantially within a surface that is in a predetermined relationship with the associated lens assembly so that the images carried upon the strip 12 may be precisely focused. In accordance with the teachings of this invention, the adjustable gate 28 is pivotally mounted as shown in FIG. 4 about the extended arms 41 of the hanger 40, which arms 41 are disposed within a plane 92 substantially normal to a focusing plane 90 in which the strip 12 is disposed and intersecting the edge of the strip 12 held by the gate 28. More specifically, the gate 28 has the pair of fingers 44 and 45 (as shown in FIGS. 1 and 4) with grooves in which the extended arms 41 are disposed. Thus, as the gate 28 is directed upward or downward (as seen in FIG. 4) as a result of the variations and dimensions of the strip 12, the groove 30 of the adjustable gate 28 will be pivoted about the arm 41 in an arcuate path 91 whose radius is the distance from the groove 30 to the arm 41. If the width or thickness of the strip 12 is increased, the adjustable gate 28 will be rotated upward along the arcuate path 91 to thereby displace the gate 28 upwards a vertical distance B with a corresponding, horizontal displacement A. As shown clearly in FIG. 4, relatively large vertical displacement B of the gate 28 results in a relatively small horizontal displacement A; therefore, the placement of the strip 12 is substantially maintained in the focusing plane 90 which is in the desired focused relationship with the associated lens assembly and display screen. Thus, strips of varying widths and thicknesses may be run through the strip feed guide 10 while substantially maintaining the image carried upon the strip 12 in focus upon the display screen.

Due to the use of intense sources of radiation, the strip 12 may tend to overheat. In order to cool the strip 12, streams of a suitable cooling means such as air are directed onto both sides of the strip 12. As shown in FIGS. 1 and 2, a pair of cooling chambers 78 and 80 are formed by the top and bottom assemblies 20 and 22 of the strip feed guide 10. The cooling medium is directed through a pair of openings 82 and 83 into the chambers 78 and 80 respectively by a suitable pump (not shown). The cooling chambers 78 and 80 constrict the flow and direct the cooling medium through a pair of ports 84 and 85 onto both sides of the strip 12. In order to more efficiently direct and confine the flow of the cooling medium from the port 84, a transparent plate 86 is disposed in front of the strip 12 as shown in FIG. 1 within a groove 87 of the bottom assembly 22.

Thus, there has been shown a strip feed guide through which a strip is directed and including a gate which is flexibly biased to accommodate variations in the width and thickness of the strip. Further, the strip feed guide is adjustable to substantially maintain the strip in a desired plane which is disposed in a focused relationship with the associated lens and display surface.

This invention has been described in detail with reference to a preferred embodiment; however, it will be understood that variations and modifications can be effected within the spirit and scope of the invention as described hereinabove and as defined in the appended claims.

We claim:

1. A strip feed guide comprising first and second guide members having opposed grooves for receiving and guiding respectively first and second edges of a strip, a support member disposed in a fixed relation with said second guide member, a mounting member for adjustably suspending said first guide member from said support member, flexible means disposed upon said support member for biasing said first guide member to allow said first and second guide members to receive and substantially support strips of varying dimensions in a focusing plane, said first guide member being pivotally mounted upon said mounting member about an axis of said mounting member, said axis being substantially parallel to the first edge of a supported strip, said axis also lying wholly in a second plane substantially normal to the focusing plane, the second plane also passing through the first edge of a supported strip.

2. A strip feed guide as claimed in claim 1, wherein stop means are disposed upon said support member to adjustably limit the movement of said first guide member.

3. Apparatus for guiding a strip having first and second edges, said apparatus comprising:
   a. first and second guide members having respectively first and second opposed grooves for receiving and guiding respectively the first and second opposed grooves for receiving and guiding respectively the first and second edges of the strip thereby supporting the strip substantially in a predetermined focusing plane, said first guide member being disposed for pivotal movement about an axis which is substantially parallel to and displaced from said first groove, said axis located entirely in a second plane perpendicular to the focusing plane, the second plane also passing through said first groove;

b. means for biasing said first guide member toward said second guide member; and c. means for adjusting the position of said first guide member with respect to said second guide member in a direction substantially perpendicular to the focusing plane.

4. The invention as defined in claim 3 further including a pair of chambers for receiving and directing flows of a cooling medium onto both sides of the strip when the strip is supported in the focusing plane.

5. A strip feed guide for positioning a strip in a focusing plane with respect to a projection system, the strip having first and second edges, said strip feed guide comprising:

a. first and second guide members having first and second opposed grooves separated by a spacing for guiding respectively the first and second edges of the strip with respect to the projection system, said first guide member being mounted for pivotal movement about an axis to allow the spacing separating said opposed grooves to vary, said axis being substantially parallel to said first groove, said axis also located wholly in a second plane perpendicular to the focusing plane, the second plane also passing through said first groove;

b. means for biasing said first guide member toward said second guide member; and c. means for adjusting the relative positions of said first and second guide members to thereby adjust the position of the strip guided therebetween with respect to the projection system such that the strip is substantially maintained in the focusing plane when the spacing separating said opposed grooves varies.

6. A strip feed guide adapted for use with a projection system, said strip feed guide comprising:

a. first and second guide members having opposed grooves for guiding and positioning respectively first and second edges of a strip with respect to the projection system;

b. biasing means associated with said first guide member to allow said first and second guide members to receive and support strips of varying dimensions substantially in a focusing plane, said first guide member being pivotally disposed about an axis which is substantially parallel to the first edge of a strip supported by said first and second guide members, said axis also being entirely disposed in a second plane substantially normal to the focusing plane, the second plane also passing through the first edge of a supported strip; and c. mounting means for adjustably disposing said first guide member with respect to the projection system.

7. A strip feed guide comprising:

a. first and second guide members having opposed grooves for receiving and guiding respectively first and second edges of a strip;

b. a support member disposed in a fixed relation with said second guide member;

c. a mounting member for adjustably suspending said first guide member from said support member; and d. flexible means disposed upon said support member for biasing said first guide member to allow said first and second guide members to receive strips of varying dimensions, said first guide member being pivotally mounted upon said mounting member about an axis, said axis being disposed in a plane substantially normal to and passing through the first edge, said mounting member including a pair of arms extending along said axis, said pair of arms being adjustably suspended from said support member by a pair of clips.

8. The invention as defined in claim 3 wherein said adjusting means includes a mounting member adjustably disposed with respect to said second guide member, said first guide being pivotally suspended from said mounting member.

9. The invention as defined in claim 8 wherein said mounting member is of a substantially U-shaped configuration having a pair of legs, and an arm extending from each of said legs, said first guide member being pivotally suspended from said arms for rotation about said axis.

10. The invention as defined in claim 9 wherein said U-shaped mounting member includes a bight portion, said mounting member being suspended by said bight portion.

* * * * *